United States Patent [19]
Jablonski et al.

[11] Patent Number: 5,701,845
[45] Date of Patent: Dec. 30, 1997

[54] ANIMAL LITTER BOX

[75] Inventors: Paul L. Jablonski, McMurray, Pa.; Charles Rodriguez, Clearwater, Fla.

[73] Assignee: Specialty Group Industries, Inc., West Mifflin, Pa.

[21] Appl. No.: 535,649

[22] Filed: Sep. 28, 1995

[51] Int. Cl.⁶ .................................................. A01K 29/00
[52] U.S. Cl. ................................... 119/166; 119/165
[58] Field of Search ..................... 119/161, 165–168, 119/171, 172

[56] References Cited

U.S. PATENT DOCUMENTS

| | | | |
|---|---|---|---|
| 3,377,990 | 4/1968 | Mitchell | 119/165 |
| 3,990,397 | 11/1976 | Lowe, Jr. | 119/165 |
| 4,649,578 | 3/1987 | Vargo | 119/166 |
| 4,723,510 | 2/1988 | Skillestad | 119/1 |
| 4,802,442 | 2/1989 | Wilson | 119/166 |
| 5,372,095 | 12/1994 | Dowling et al. | 119/166 |
| 5,507,248 | 4/1996 | Gabbert | 119/166 |
| 5,517,947 | 5/1996 | Christman | 119/166 |

FOREIGN PATENT DOCUMENTS 3420837  12/1985  Germany.

*Primary Examiner*—David H. Willse
*Assistant Examiner*—David J. Cho
*Attorney, Agent, or Firm*—Carothers & Carothers

[57] ABSTRACT

An animal litter box system including a solid litter base box and a litter sifting box having perforations in its bottom for sifting litter. The sifting box is adapted to nest or stack in the base box. Opposing outer portions of the sifting box bottom are inwardly sloped at an angle which is less than 90° relative to the bottom of the box and the sifting perforations are confined between these sloped opposing outer portions.

11 Claims, 2 Drawing Sheets

ANIMAL LITTER BOX

BACKGROUND OF THE INVENTION

The present invention pertains to litter boxes for small domesticated animals, and particularly for house cats.

Pet owners, with particular reference to kittens or cats, find it annoying and unpleasant to periodically clean the animal's litter box. Between changes of the litter, the pet owner commonly sifts out used portions of particle litter with a slotted spatula-like device which permits the fresh litter to sift through the slots back into the litter box for reuse, and retains the used litter portions which become agglomerated after contacting animal feces, excrement or urine.

A number of litter box systems have been developed over the years which include means for sifting the used litter by mechanisms already incorporated in the litter box.

For example, U.S. Pat. No. 4,723,510, discloses a device for facilitating the removal of feline feces from a litter box wherein a base litter box is stacked or nested with a series of perforated boxes therein which permit sifting of the litter so that the remaining sifted litter can be reused. Each sifting box is disposed of, together with the contained feces after sifting.

While such a litter box system is effective, nevertheless, it does have some drawbacks.

First of all, the system is designed to dispose of the sifting of plastic liner trays and they therefore cannot be recycled and are not reusable.

Additionally, these prior art sifting trays are provided with large sifting holes which cover almost the entire bottom surface of the sifting pan. This causes the sifting pan to suddenly sift or drop too much used litter at one time through the sifting perforations, which not only lets undesired portions of used litter to pass, but also creates a mess and spillage over or around the base container on to the floor when one begins to shake the sifting tray to assist sifting.

On the other hand, it is desirable to maintain large diameter sifting holes so that the sifting process is fast.

It is a principal object of the present invention to provide a reusable litter box system which incorporates a stack of sifter units within a base box that sifts the used litter in a fast and efficient manner, yet prevents messy spillage of the litter being sifted over the underlying base unit when one shakes the sifting unit.

SUMMARY OF THE INVENTION

The animal litter box of the present invention includes a litter base box having a bottom and side walls, in combination with a litter sifting box having a horizontal bottom and inwardly sloped side walls. The sifting box is provided with perforations in its bottom for sifting litter therethrough and the sifting box is also adapted for nesting in the base box.

The improvement resides in the construction of the litter box wherein opposing outer portions of the sifting box bottom are inwardly sloped at an angle which is less than 90° relative to the horizontal sifting box bottom and the perforations are solely confined between these sloped opposing outer portions.

The sifting perforations are closely arranged with respect to each other and are accordingly confined in a central area of the sifting box bottom. This central area is spaced from the side walls sufficiently so that when the sifting operation is carried out the sifting only occurs in the central area or portion of the sifting box.

Accordingly when one shakes the sifting box to assist the sifting action, the falling litter which sifts therethrough is confined to a more central area thereby making it less likely to create or make messy spills which overflow the underlying base box on to the floor.

In addition, the sifting perforations are still sufficiently large (in the approximate range of ¼ inch by ¼ inch to ½ inch by ½ inch) and are grouped sufficiently close together so that the sifting action is still fast and efficient and the inwardly sloped opposing outer portions of the sifting box bottom assist the sifting action by funneling the litter to the centrally located sifting perforations.

The base box is identical in form and shape to the sifting box, except for the exclusion of sifting perforations, which provides tight nesting capabilities of the sifting box within the base box. In fact, multiple sifting boxes may be stacked within the sifting box.

Also, as the sifting boxes are used, they may be washed or otherwise cleaned and then stored by stacking the base box into the used sifting box.

In order to further assist the sifting capabilities of the perforated sifting area, the sifting box perforations may also be provided with inwardly tapered side edges for funneling litter downwardly therethrough.

The boxes are preferably constructed of any acceptable plastic, such as polyethylene or polyvinyl chloride. Preferably they are constructed of recycled plastic and they are also preferably constructed of plastic that is recyclable.

A preferred angle of slope for the opposing outer portions of the sifting box bottom is in the area of 15°.

The litter box system of the present invention provides a litter box system which is efficient and reusable.

BRIEF DESCRIPTION OF THE DRAWINGS

Other objects and advantages appear in the following description and claims. The accompanying drawings show, for the purpose of exemplification, without limiting the invention or claims thereto, certain practical embodiments illustrating the principals of this invention wherein:

DETAILED DESCRIPTION OF A PREFERRED EMBODIMENT

Figure 1:
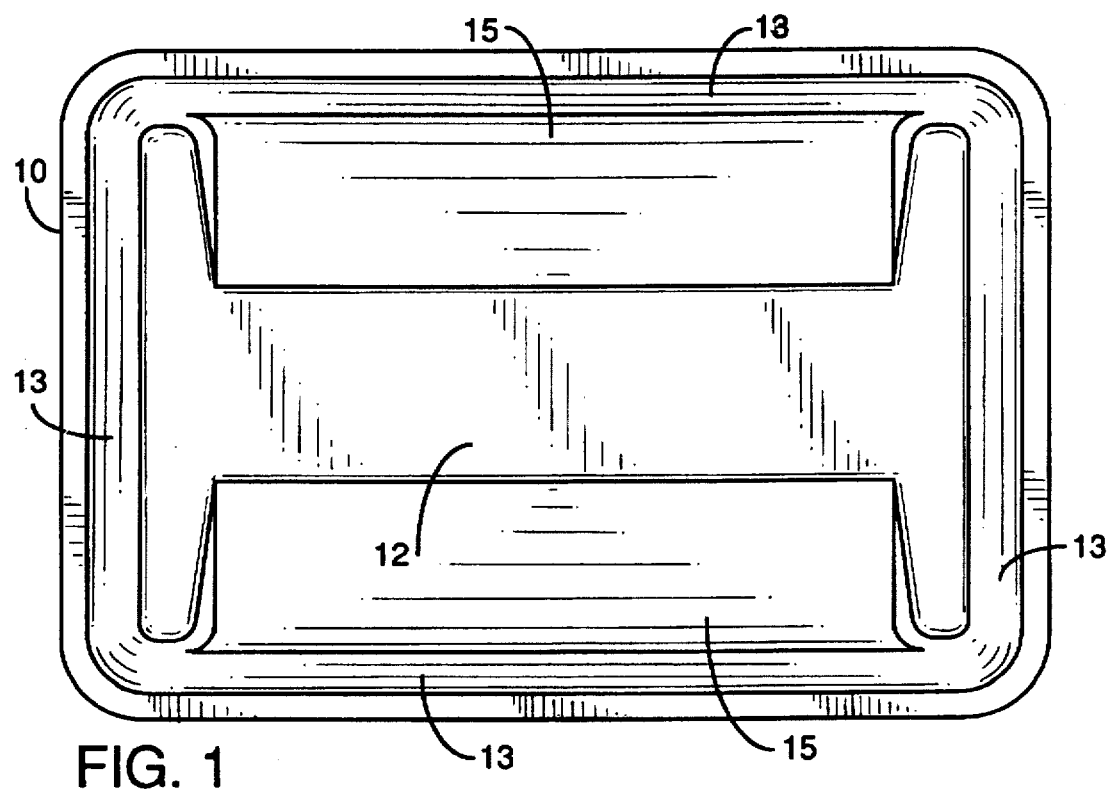
FIG. 1 is a plan view of the base litter box portion of the animal litter box system of the present invention.
Figure 2:
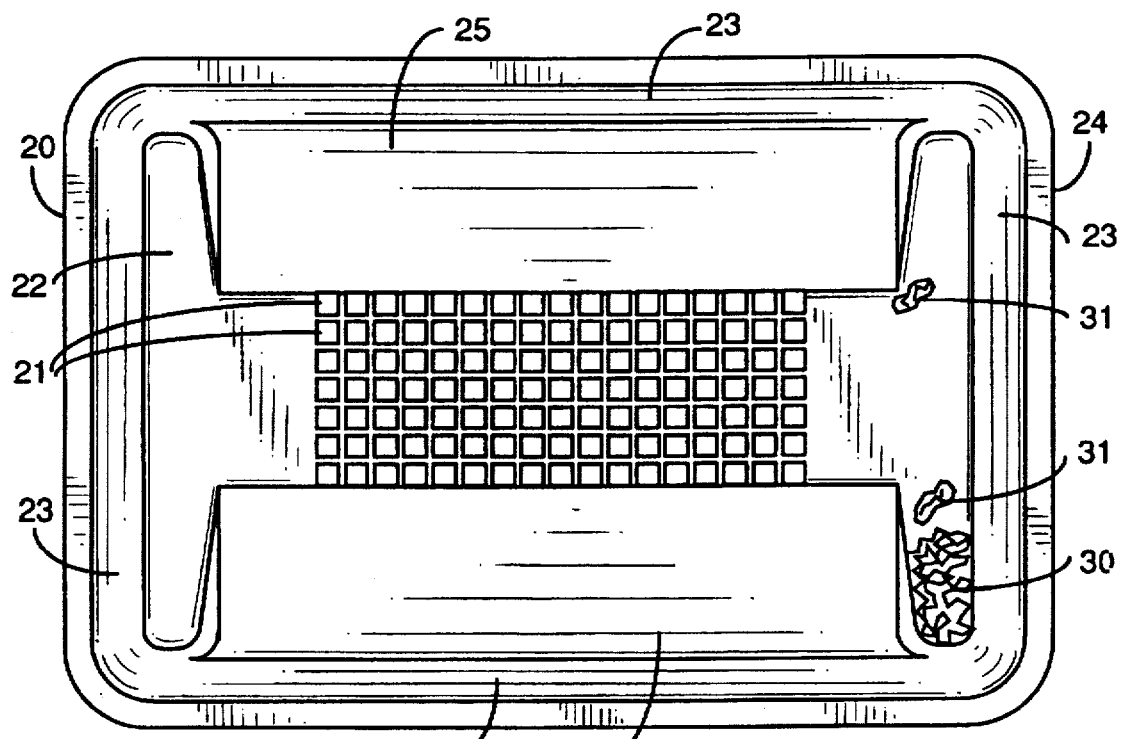
FIG. 2 is a plan view of a litter sifting box portion of the system made in accordance with the teachings of the present invention, which is of identical form and shape as the base box of FIG. 1 with the exception of the inclusion of sifting perforations, and is to be used in nesting combination with the base litter box shown in FIG. 1.

Referring to the drawings, the animal litter box system of the present invention includes a litter base box 10 shown in FIG. 1 in plan view and a litter sifting box 20 shown in plan view in FIG. 2.

Both boxes 10 and 20 are molded of a suitable plastic, such as polyethylene or polyvinyl chloride, or any suitable recyclable plastic. In fact, they are preferably molded of recycled plastic products. Boxes 10 and 20 are of identical form and shape and they are produced from a similar plastic mold. The only difference between the two boxes is that sifting box 20 has a central area which is provided with sifting perforations 21 which are molded into the central area of sifting box 20 after molding. It has been found to be much more expensive or costly to punch the perforations into the sifting box.

Both litter base box and litter sifting box 10 and 20 respectively have horizontal bottoms 12 and 22 and inwardly sloped sides 13 and 23, respectively.

Figure 3:
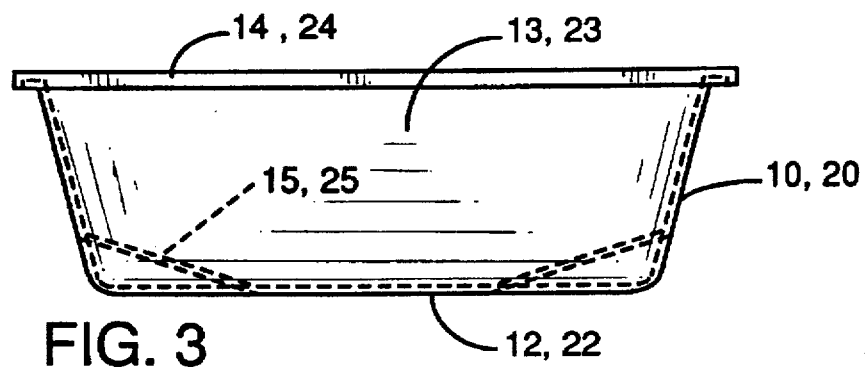
FIG. 3 is an end view of both or either one of the base box and sifting box shown in FIGS. 1 and 2.
Figure 4:
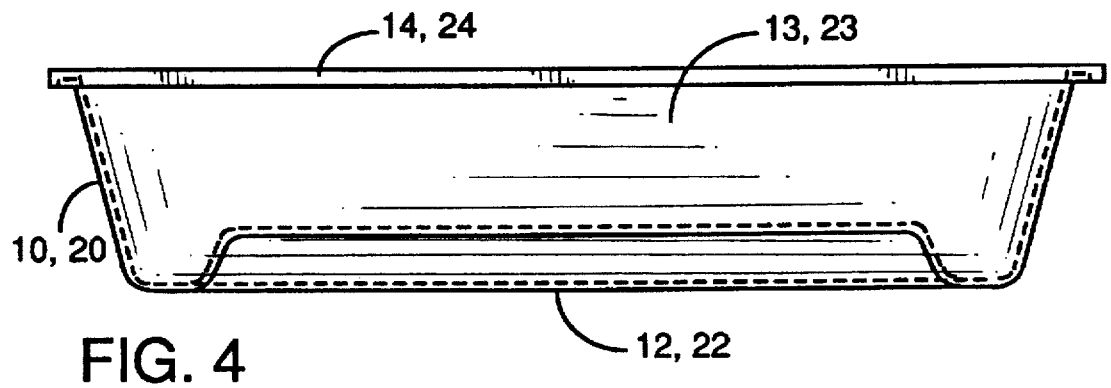
FIG. 4 is a view in side elevation of either the base box or the sifting box shown in FIGS. 1 and 2.

Because boxes 10 and 20 are identical in shape and form, their end views and side views as shown in FIGS. 3 and 4 are therefore also identical and accordingly reference numerals for both boxes are designated on these two figures.

Figure 5:
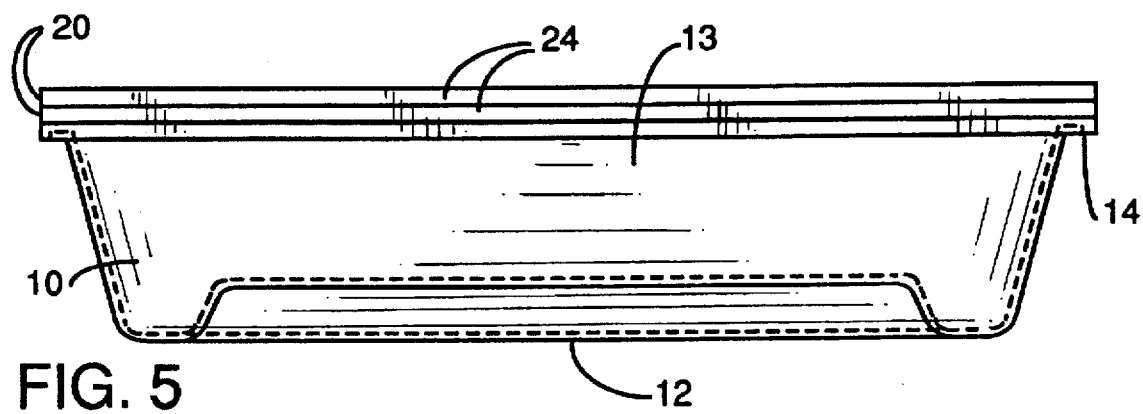
FIG. 5 is a view in side elevation illustrating the base box of FIG. 1 with multiple sifting boxes of FIG. 2 nested therein.
Figure 6:
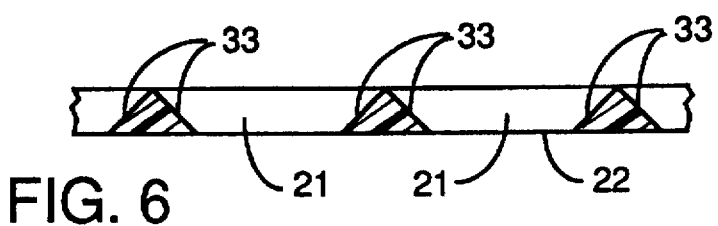
FIG. 6 is an enlarged view in vertical cross section of a portion of the perforated sifting bottom of the sifting box illustrated in FIG. 2 illustrating the detail of the perforation configuration.

By reason of the fact that boxes 10 and 20 are of identical shape and form, and also provided with tapered sides, this permits them to be nested into each other as illustrated in FIG. 5.

In FIG. 5, only the dashed outline illustrating the wall thickness of plastic base box 10 is shown because if the wall thickness of sifting boxes 20 were also illustrated in the figure it would render the figure confusing. Only the upper parametrial lip 24 of sifting boxes 20 is seen in FIG. 5. These two perimetrical lips 24 are indicated as resting on the top of the perimetrical lip 14 of base box 10.

Both base box 10 and sifting box 20 are provided with opposing outer portions 15 and 25 respectively of their bottoms 12 and 22 which are inwardly sloped at an angle which is less than 90° relative to the horizontal bottoms 12 and 22. As is seen in FIG. 2, the perforations 21 are all confined in a central area between these sloped opposing outer portions 25. These angled surfaces assist in directing the flow of the litter toward or to the central sifting area created by sifting perforations 21.

As previously explained, this causes the litter 30 being sifted to quickly converge toward the central sifting area created by sifting perforations 21. The person utilizing the system may assist the sifting action by shaking sifting box 20 while holding the same over base box 10. Due to the confined nature of the sifting area perforations 21 all sifted particles of litter 30 will fall directly into the underlying base box 10 and will not create a mess or be easily spread beyond the outer limits of the parametrial lip 14 of base box 10 to create a mess on the floor.

When the sifting operation is completed, the feces 31 remains in sifting box 20. Sifting box 20 is then inverted over a trash receptacle to remove feces 31 and any remaining litter 30 and then it is cleaned and stored for reuse by placing it under base box 10, or nesting base box 10 into used sifting box 20.

Accordingly, the pet owner places the solid base litter box 10 in a desired area in the home and places one or more of the litter sifting boxes 20 on top of the base litter box in a nesting stacked arrangement as shown in FIG. 5. The top or upper most sifting box is then filled with animal litter.

When the pet has deposited an amount of excrement into the litter, the pet owner at his discretion picks up the top or upper most sifting box and slowly allows the angled portions 25 to direct the flow of litter 30 into the slotted center of the unit causing the clean litter to flow out through the slots into the next underlying litter sifting unit or box 20.

In order to assist the sifting action of sifting box 20, the sifting perforations 21 may be provided with sloped or inwardly tapered side edges 33 for funneling litter downwardly therethrough.

By way of example, only approximately ⅓ of the bottom 22 is perforated with sifting perforations and in the example illustrated there are provided three slots per inch and the angle of slope for portions 15 and 25 is provided at 15°. The perforations are spaced at least 3 inches from any side wall.

I claim:

1. In an animal litter box including a litter base box having a bottom and side walls, and a litter sifting box having a horizontal bottom and inwardly sloped side walls and perforations in a central portion of said horizontal sifting box bottom for sifting litter therethrough and shaped for nesting in said base box, wherein the improvement comprising: an unperforated opposing outer portions of said sifting box bottom which are inwardly sloped at an angle which is less than 90° relative to said horizontal sifting box bottom, and said perforations having an inwardly tapered side edges for funneling litter downwardly therethrough and confined between said sloped opposing outer portions.

2. The animal litter box of claim 1 wherein said base box is identical in form and shape to said sifting box except for the exclusion of sifting perforations.

3. The animal litter box of claim 2 including a plurality of said litter sifting boxes nested in each other and nested as a stack in said base box.

4. The animal litter box of claim 2 wherein said base box is adapted to nest in said sifting box.

5. The animal litter box of claim 2 wherein said base and sifting boxes are plastic.

6. The animal litter box of claim 5 wherein said plastic is recycled plastic.

7. The animal litter box of claim 5 wherein said plastic is recyclable.

8. The animal litter box of claim 2 wherein said perforations are angular and their size is in the approximate range of ¼ inch by ¼ inch to ½ inch by ½ inch.

9. The animal litter box of claim 8 wherein said perforations are closely arranged with respect to each other and confined in a central area of said sifting box bottom.

10. The animal litter box of claim 9 wherein said central area is spaced from said side walls by at least three inches.

11. The animal litter box of claim 1 wherein said angle is approximately 15°.

\* \* \* \* \*